United States Patent
Krueger et al.

(10) Patent No.: US 11,441,631 B2
(45) Date of Patent: Sep. 13, 2022

(54) BRAKE SYSTEM FOR SLOWING DOWN A FLAP OF A MOTOR VEHICLE

(71) Applicant: Brose Fahrzeugteile GmbH & Co. KG, Hallstadt, Hallstadt (DE)

(72) Inventors: Harald Krueger, Bamberg (DE); Nico Oertel, Zapfendorf (DE); Alexander Reich, Weitramsdorf (DE); Niels Glage, Bamberg (DE); Florian Hoefner, Coburg (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 14/914,333

(22) PCT Filed: Aug. 25, 2014

(86) PCT No.: PCT/EP2014/067959
§ 371 (c)(1),
(2) Date: Feb. 25, 2016

(87) PCT Pub. No.: WO2015/028410
PCT Pub. Date: Mar. 5, 2015

(65) Prior Publication Data
US 2016/0208880 A1    Jul. 21, 2016

(30) Foreign Application Priority Data
Aug. 28, 2013   (DE) .................. 10 2013 109 314.0

(51) Int. Cl.
*F16F 7/04* (2006.01)
*F16F 7/02* (2006.01)

(52) U.S. Cl.
CPC ................................. *F16F 7/023* (2013.01)

(58) Field of Classification Search
CPC . F16F 7/023; F16F 7/04; E05F 15/622; E05F 15/624; E05F 3/16; E05Y 2900/546; H02K 7/102
See application file for complete search history.

(56) References Cited

U.S. PATENT DOCUMENTS 1,644,653 A * 10/1927 Church ............... F16F 7/04
                                              267/206
1,697,413 A *  1/1929 Church ............... F16F 7/04
                                              267/206
(Continued)

FOREIGN PATENT DOCUMENTS

DE      19918614       11/1999
DE     202004019734     4/2006
(Continued)

OTHER PUBLICATIONS

Office Action for Japanese Patent Application No. 2016-537247 dated Mar. 13, 2017 (8 pages) with English summary.
(Continued)

*Primary Examiner* — Robert A. Siconolfi
*Assistant Examiner* — Stephen M Bowes
(74) *Attorney, Agent, or Firm* — Pauly, DeVries Smith & Deffner LLC (57) ABSTRACT

The application relates to a brake arrangement for braking a flap of a motor vehicle, wherein a connecting element, which is rotatable in a braked manner about a brake axis, for releasing the braking force is provided. It is proposed that a housing accommodating the connecting element and having a first housing part and a second housing part is provided, and that the braking force is adjustable by means of an adjustment movement of the two housing parts with respect to each other.

19 Claims, 7 Drawing Sheets

(56) References Cited

U.S. PATENT DOCUMENTS

| | | | | |
|---|---|---|---|---|
| 5,605,208 | A | * | 2/1997 | Friedrichsen ............ F16F 7/04 16/354 |
| 6,240,801 | B1 | * | 6/2001 | Kojima ................ B60K 26/021 267/155 |
| 2006/0249343 | A1 | | 11/2006 | Prottengeier et al. |
| 2006/0289821 | A1 | * | 12/2006 | Ritter ........................ E05F 5/00 251/129.13 |
| 2010/0071264 | A1 | * | 3/2010 | Faulkner ............... E05F 15/603 49/26 |

FOREIGN PATENT DOCUMENTS

| | | | | |
|---|---|---|---|---|
| DE | 102008019385 | | 10/2009 | |
| DE | 202008016929 | | 5/2010 | |
| EP | 2570695 | | 3/2013 | |
| FR | 365266 | A * | 9/1906 | ............... F16F 7/04 |
| FR | 541856 | A * | 8/1922 | ............... F16F 7/04 |
| FR | 548834 | A * | 1/1923 | ............... F16F 7/04 |
| JP | 09240378 | | 9/1997 | |
| JP | 2004044368 | | 2/2004 | |

OTHER PUBLICATIONS

"German Search Report," for German Application No. 102013109314.0 which is a priority application for U.S. Appl. No. 14/914,333, dated Aug. 28, 2013 (5 pages).

"International Preliminary Report on Patentability," for International Application No. PCT/EP2014/067959, which is a priority application for U.S. Appl. No. 14/914,333, dated Mar. 1, 2016 (5 pages).

"International Search Report and Written Opinion," for International Application No. PCT/EP2014/067959, which is a priority application for U.S. Appl. No. 14/914,333, dated Mar. 5, 2015 (12 pages).

First Office Action for Chinese Patent Application No. 201480047493. 2, dated Dec. 5, 2016 (16 pages) with English translation.

Office Action for Korean Patent Application No. 10-2016-7008108 dated Jul. 9, 2017 (14 pages) with English translation.

* cited by examiner

BRAKE SYSTEM FOR SLOWING DOWN A FLAP OF A MOTOR VEHICLE

CROSS-REFERENCE TO RELATED APPLICATIONS

This application is a national stage application under 35 U.S.C. 371 of International Patent Application Serial No. PCT/EP2014/067959, entitled "Bremsanordnung für das Bremsen einer Klappe eines Kraftfahrzeugs," filed Aug. 25, 2014, which claims priority from German Patent Application No. DE 10 2013 109 314.0, filed Aug. 28, 2013, the disclosures of which are incorporated herein by reference.

FIELD OF THE TECHNOLOGY

The present document relates to a brake arrangement for braking a flap of a motor vehicle, to a flap drive with such a brake arrangement and to a method for producing a flap drive.

BACKGROUND

A comfortable and above all safe adjustment of flaps of a motor vehicle is of particular importance in particular against the background of high flap weights. In the present case, the term "flap" should be understood comprehensively. It includes tailgates, rear covers, engine hoods, doors, in particular side doors, loading compartment floors or the like of a motor vehicle. The adjustment of a tailgate of a motor vehicle is in the foreground here.

The braking of a tailgate of a motor vehicle is of importance in particular with regard to a possible, gravitation-induced closing movement. This relates not only to manually adjustable tailgates, but in particular to tailgates adjustable in a motorized manner. In the last-mentioned case, a malfunction of the flap drive may result in unintentional shutting of the flap, which, in view of the high flap weights already mentioned, comprises a considerable accident risk. The same applies if the tailgate is pretensioned in the opening direction by a powerful spring arrangement, for example by a gas-filled compression spring.

The known brake arrangement (DE 20 2008 016 929 U1), on which the invention is based, is assigned to a flap drive. The brake arrangement itself is designed as a friction brake which releases a braking force attributed to a frictional engagement. Within the context of a clear representation, the term "braking force" here comprises a braking force in the narrower sense and also a braking torque.

A disadvantage with the known driving arrangement is the fact that the braking force released by the brake arrangement depends on manufacturing tolerances, and therefore observing exacting braking force tolerances appears to be associated with high manufacturing costs.

SUMMARY

The application is based on the problem of designing and developing the known brake arrangement in such a manner that exacting braking force tolerances can be realized at low manufacturing costs.

The above problem is solved in the case of a brake arrangement according to embodiments described herein.

The fundamental consideration of configuring the brake arrangement in such a manner that the braking force is adjustable is essential. Therefore, manufacturing tolerances of the components involved in the braking operation can be compensated for even as the brake arrangement is being installed.

Within the context of a robust and at the same time cost-effective design of the brake arrangement, it is furthermore proposed that the connecting element which serves to release the braking force is accommodated by a housing, that the housing has a first housing part and a second housing part, and that the braking force is adjustable by means of an adjustment movement of the two housing parts with respect to each other. The consideration of using the adjustable housing of the brake arrangement for adjusting the braking force is essential here. The resulting double use of the housing, namely firstly for accommodating the components involved in the braking operation and secondly for adjusting the braking force, also results in a particularly compact arrangement.

The connecting element is, to a certain extent, the interface with the element to be braked. Accordingly, the connecting element is rotatable in a braked manner about a brake axis. The connecting element can fundamentally also be formed integrally with the element to be braked and/or can be part of the element to be braked.

In an embodiment, the brake arrangement is a frictionally engaged brake arrangement, as a result of which the adjustability is configured in a particularly simple manner. Specifically, it is proposed in an embodiment that at least two brake elements are pretensioned on one another in an adjustable manner, thus resulting in the adjustability of the resulting braking force.

Various embodiments relate to advantageous refinements of an adjustment mechanism which is assigned to the housing and serves primarily for the adjustable fixing of the two housing parts with respect to each other. The adjustment mechanism therefore ensures that the two housing parts are fixed in relation to each other at the respectively set braking force.

In an embodiment, the adjustment mechanism in the widest sense has a screwing mechanism with which a corresponding braking force results depending on the pivoted position of the two housing parts with respect to each other.

Within the context of particularly simple mountability of the two housing parts, it is proposed that the adjustment mechanism provides a coupling in the manner of a quarter-turn fastener between the two housing parts, and therefore the assembly of the two housing parts to each other turns out to be particularly simple.

According to an embodiment, a flap drive for the motorized adjustment of a flap of a motor vehicle is described herein, wherein a brake arrangement according to the proposal is arranged in or on the drive train of the flap drive.

It is, in turn, of interest in the case of the flap drive according to the proposal that particularly exacting braking force tolerances can be observed without the manufacturing costs rising excessively. It is furthermore of interest that such a flap drive is subject during prolonged use to aging phenomena which may require a readjustment of the braking force released by the brake arrangement. With the brake arrangement according to the proposal, it is basically possible to undertake an adjustment of the braking force even when the flap drive is fitted.

Furthermore, reference should be made to all of the explanations for the brake arrangement according to the proposal in order to explain the further teaching.

An embodiment provides a method for producing an above flap drive.

It is essential according to the further teaching that the brake arrangement is adjusted to an in particular predetermined braking force. In an embodiment, the adjustment of the braking force is undertaken before the brake arrangement is fitted into the drive and, in some embodiments, before the drive is fitted into a motor vehicle. It is, in turn, of interest here that the adjustability of the brake arrangement according to the proposal makes it possible to react to manufacturing tolerances in the components involved in the braking operation. Reference should be made to all of the statements regarding the brake arrangement according to the proposal and the flap drive according to the proposal.

An embodiment provides a brake arrangement for braking a flap of a motor vehicle, wherein a connecting element, which is rotatable in a braked manner about a brake axis, for releasing the braking force is provided, wherein a housing accommodating the connecting element and having a first housing part and a second housing part is provided, and wherein the braking force is adjustable by means of an adjustment movement of the two housing parts with respect to each other.

In an embodiment, the generation of the braking force is attributed to a frictional engagement between at least two brake elements, such as wherein at least one of the brake elements is arranged with respect to the brake axis so as to be non-rotatable in relation to the housing, and wherein at least one of the brake elements is coupled to the connecting element, in particular is part of the connecting element.

In an embodiment, the brake elements, are pretensioned on one another, such as by means of a spring arrangement, and wherein the pretensioning is adjustable by the adjustment movement of the two housing parts with respect to each other, such as wherein the pretensioning is oriented along the brake axis.

In an embodiment, the pretensioning of the brake elements is associated with a pretensioning of the housing parts in relation to each other.

In an embodiment, the housing is assigned an adjustment mechanism for the adjustable fixing of the two housing parts with respect to each other.

In an embodiment, the adjustment movement is a longitudinal movement along the brake axis or a screwing movement about the brake axis.

In an embodiment, the adjustment mechanism, in the manner of a gearing, converts an actuating movement acting on one of the housing parts into an adjustment movement, such as wherein an actuating movement, which is a rotational or pivoting movement, is converted via the adjustment mechanism into an adjustment movement with a linear movement portion, in particular with a linear movement portion along the brake axis.

In an embodiment, the adjustment mechanism has a screw mechanism, such as wherein the screw mechanism has at least one engagement portion, in particular a threaded portion, which is in, or can be brought into, screwed engagement with at least one mating engagement portion, in particular a mating threaded portion.

In an embodiment, the engagement between threaded portion and mating threaded portion is a form-fitting, in particular latching engagement blocking a screwing movement.

In an embodiment, the adjustment mechanism provides a coupling in the manner of a quarter-turn fastener between the two housing parts such that a fixing of the two housing parts with respect to each other, in each case with respect to the brake axis, requires an axial movement, followed by a pivoting movement.

In an embodiment, the engagement between threaded portion and mating threaded portion provides the coupling in the manner of a quarter-turn fastener between the two housing parts.

In an embodiment, the adjustment mechanism provides a latching arrangement for the adjustable, latching fixing of the two housing parts with respect to each other, such as wherein the latching engagement between the two housing parts can be produced by a linear adjustment movement of the two housing parts along the brake axis.

In an embodiment, at least one housing part is of substantially cup-like design and is aligned with the brake axis, and/or wherein at least one housing part is of substantially cover-like design and is aligned with the brake axis.

An embodiment provides a brake arrangement as described hereing is arranged in or on the drive train of the flap drive.

An embodiment provides a method for producing a flap drive as described herein, wherein the brake arrangement, in particular before the fitting thereof into the flap drive and/or before the flap drive is fitted into a motor vehicle, is adjusted to an in particular predetermined braking force.

BRIEF DESCRIPTION OF THE FIGURES

The invention is explained in more detail below with reference to a drawing merely illustrating exemplary embodiments. In the drawing

DETAILED DESCRIPTION

The brake arrangement 1 illustrated serves for braking a flap 2 of a motor vehicle. With respect to the broad understanding of the term "flap", reference should be made to the introductory part of the description.

All of the embodiments illustrated for a brake arrangement 1 according to the proposal have an identical basic design, in so far as the realization of the braking operation is concerned. To this extent, identical reference signs are used for functionally identical components.

The brake arrangement 1 according to the proposal has a connecting element 4, which is rotatable in a braked manner about a brake axis 3, for releasing braking force. The design of the connecting element 4 can best be gathered from the illustration according to FIG. 3. The connecting element 4 is equipped here with a leadthrough 5 which runs along the brake axis 3 and, in the lower region of FIG. 3, has a receiving space 6 for an optionally provided coupling arrangement. This is explained in more detail further below.

Figure 1:
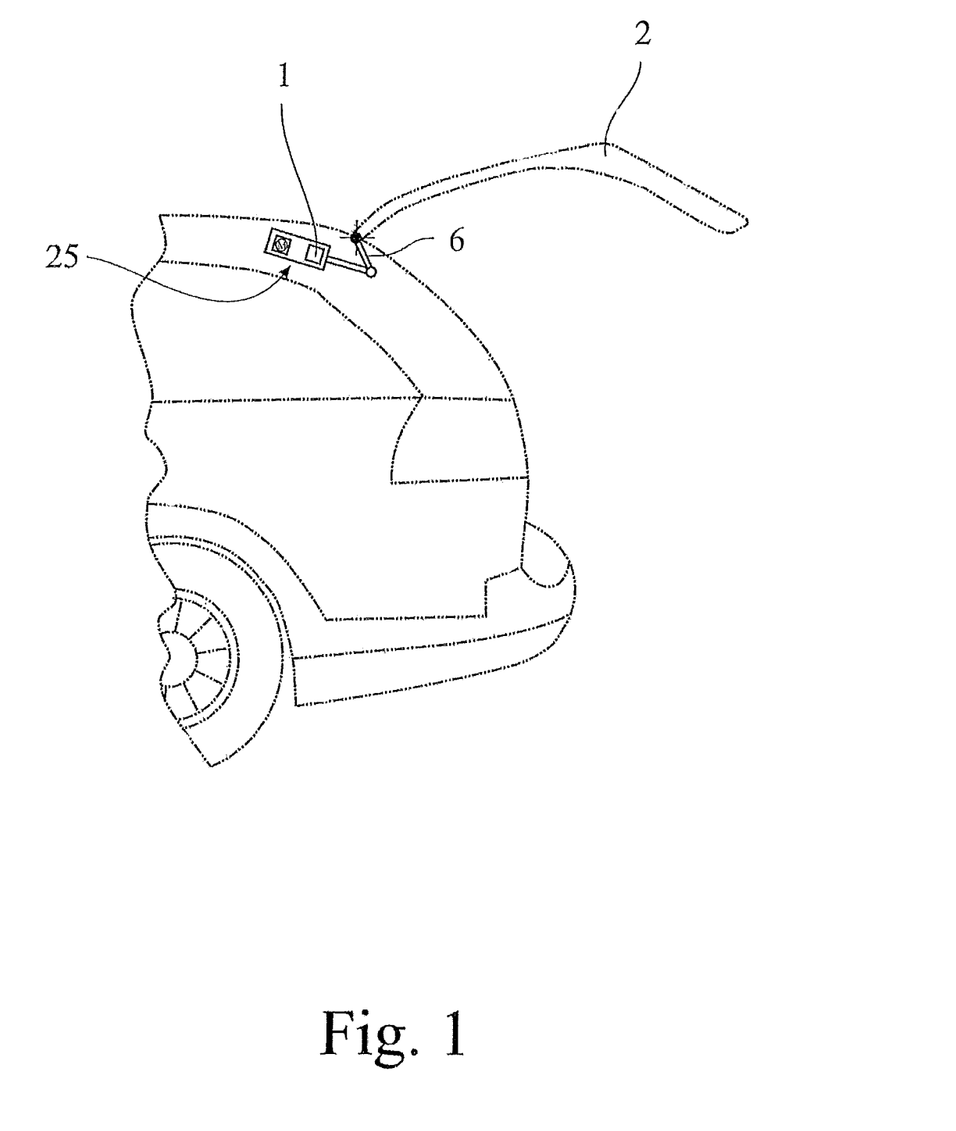
FIG. 1 shows the rear region of a motor vehicle with a flap drive according to the proposal and with a brake arrangement according to the proposal.
Figure 2:
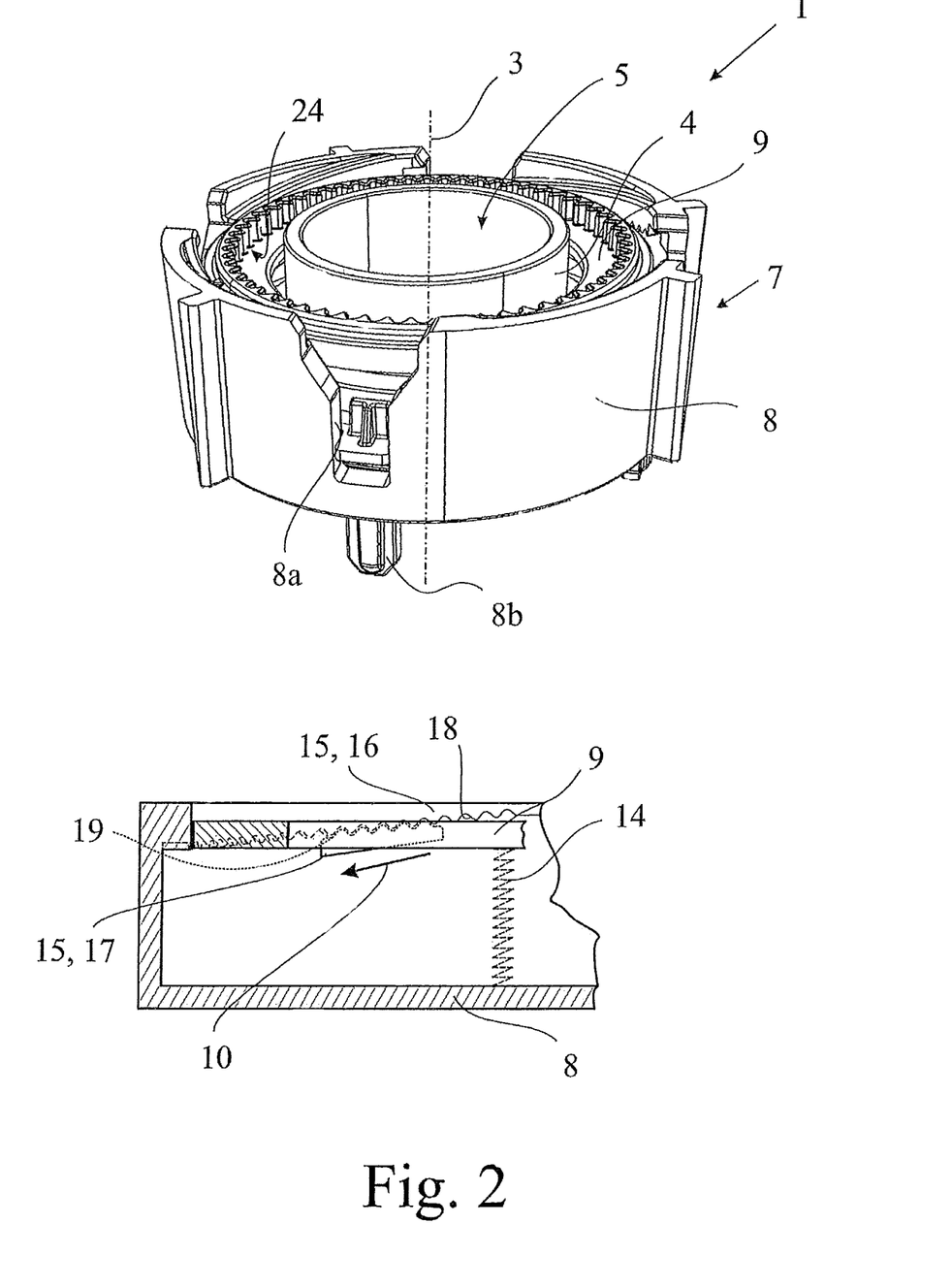
FIG. 2 shows, in a perspective illustration and in a schematic illustration, the brake arrangement according to FIG. 1 in the mounted state.

As shown in FIG. 2, a housing 7 accommodating the connecting element 4 is provided, wherein the braking force to be released, specifically the braking torque to be released, acts here between the housing 7 and the connecting element 4.

Figure 4:
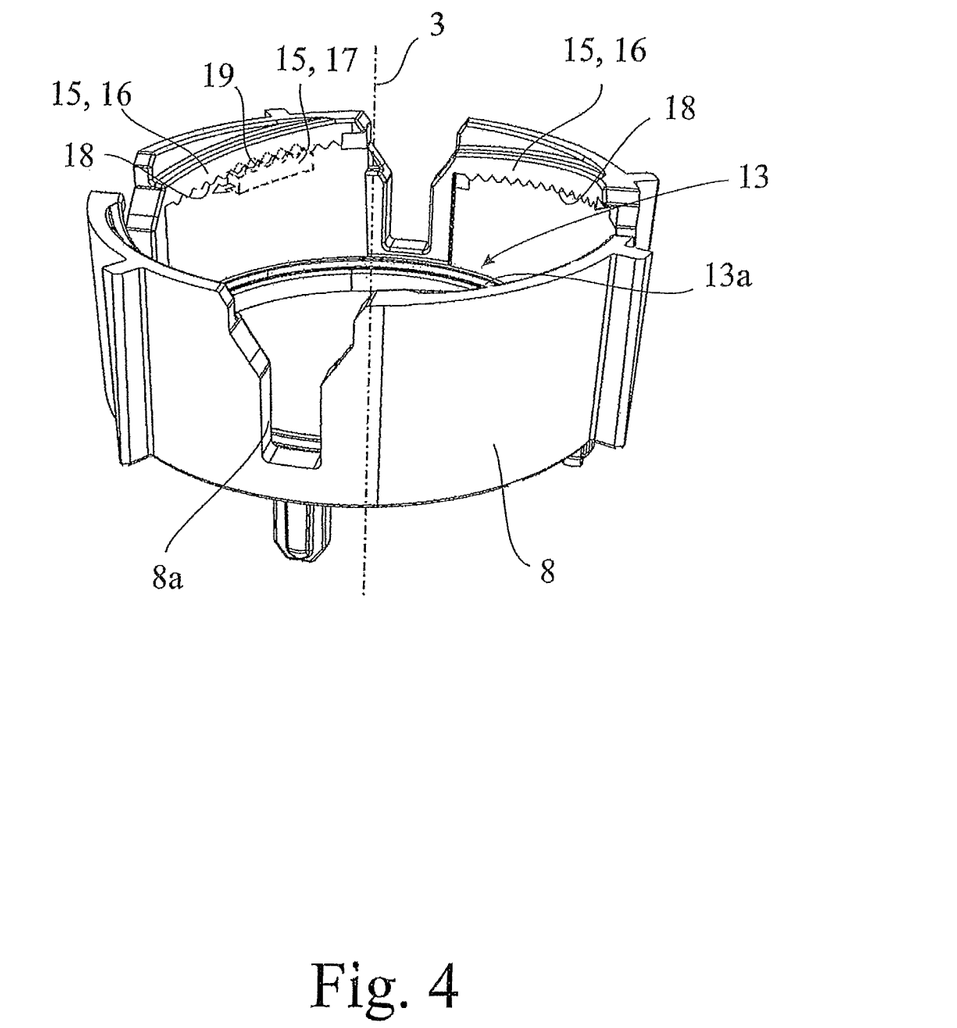
FIG. 4 shows a perspective illustration of a cup-like housing part of the brake arrangement according to FIG. 2.

The housing 7 has a first housing part 8 and a second housing part 9. The first housing part 8 is of cup-like design and is illustrated in FIG. 4. The second housing part 9 is of cover-like design and is fixed on the first housing part 8 in a manner likewise still to be explained. The terms "cup-like" and "cover-like" should be understood broadly here and also comprise such designs in which individual housing parts, for example a cup base or a cover surface, are only partially realized.

The braking force released via the connecting element 4 can be adjusted, according to the proposal, by an adjustment movement 10 of the two housing parts 8, 9 with respect to each other. This is achieved in a structurally particularly simple manner in the exemplary embodiments illustrated.

In all of the exemplary embodiments illustrated, the brake arrangement according to the proposal can have three brake elements 11, 12, 13, wherein the generation of the braking force is attributed to a frictional connection between the brake element 11 on the connecting-element side and the two brake elements 12, 13 which are non-rotatable relative to the housing 7.

The brake element 11 has, on both sides, an annular brake surface 11a, 11b which is arranged on the connecting element 4. The brake element 11 here is part of the connecting element 4.

Figure 3:
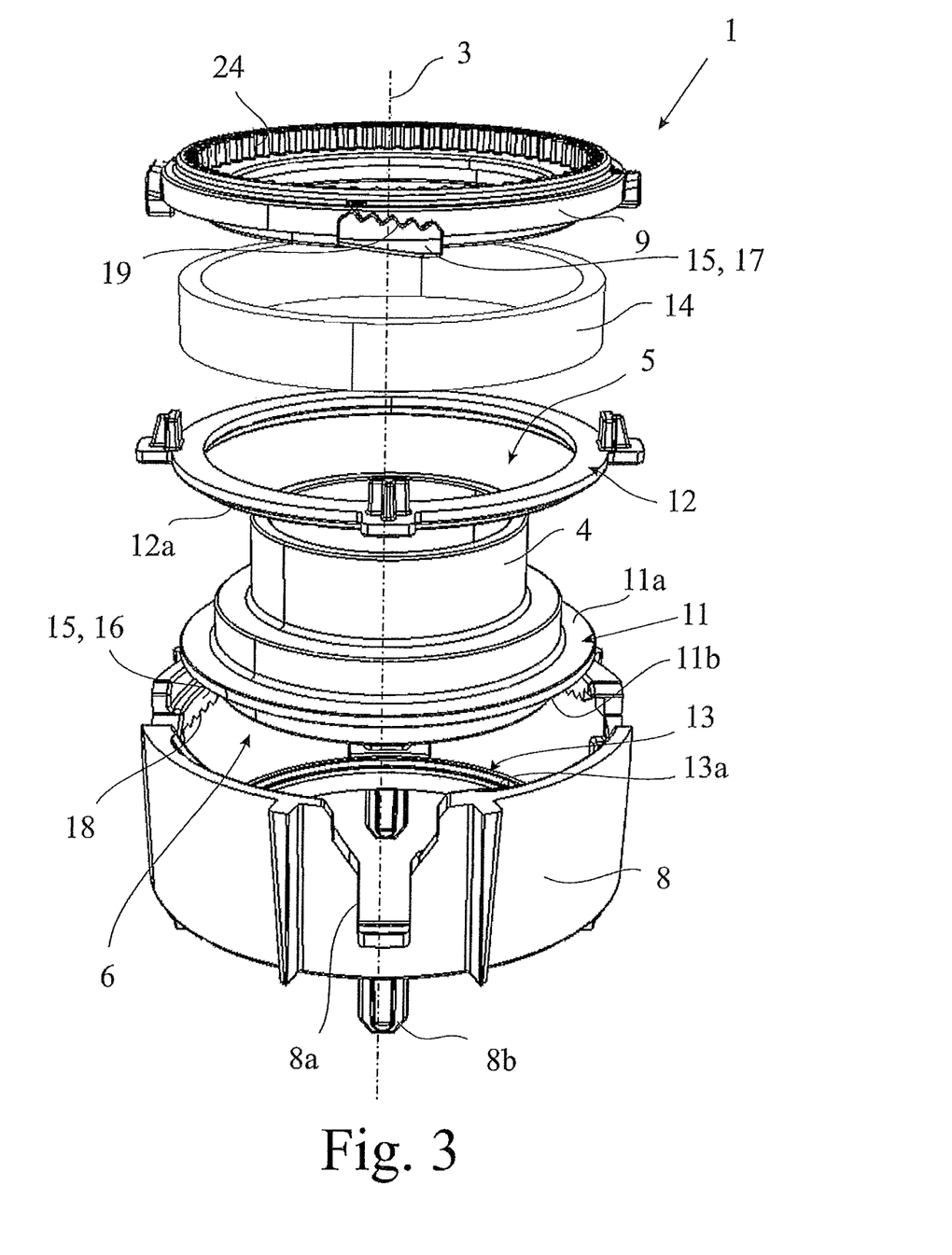
FIG. 3 shows an exploded illustration of the brake arrangement according to FIG. 2.

As shown in FIG. 3, the brake element 12 is designed as a ring with a brake surface 12a which interacts with the brake surface 11a of the brake element 11. The annular brake element 12 is mounted in an axially displaceable, but non rotatable, manner with respect to the brake axis 3 via cutouts 8a in the housing part 8.

The further brake element 13 is part of the housing part 8 and is likewise designed so as to be non-rotatable in relation to the housing 7. The brake surface 13a of the further brake element 13 interacts with the brake surface 11b of the brake element 11. The brake element 11 is therefore enclosed on both sides by the two brake elements 12, 13.

The brake elements 11, 12, 13 are pretensioned on one another here by means of a spring arrangement 14 (merely indicated in the drawing), such as by means of a helical compression spring. Specifically, the spring arrangement 14 acts firstly on the housing part 9 and secondly, via the brake element 12 and the brake element 11, on the brake element 13 and therefore on the housing part 8.

It emerges from the illustration according to FIG. 3 that the pretensioning between the brake elements 11, 12, 13 is adjustable by means of an adjustment movement of the two housing parts 8, 9 with respect to each other. The pretensioning is aligned here along the brake axis 3.

In order to secure the adjusted state of the two housing parts 8, 9 and the resulting adjusted braking force, the housing 7 can be assigned an adjustment mechanism 15 for the adjustable fixing of the two housing parts 8, 9 with respect to each other. The primary concern in the exemplary embodiments illustrated here is to oppose the pretensioning by the spring arrangement 14 with a corresponding counterforce in the respective adjusted state.

It emerges therefrom that the pretensioning of the brake elements 11, 12, 13 is associated with a corresponding pretensioning of the housing parts 8, 9 in relation to each other. The pretensioning of the brake elements 11, 12, 13 here is identical to the pretensioning of the housing parts 8, 9.

The embodiments illustrated substantially differ in the respective realization of the adjustment mechanism 15. This is expressed, for example, by the fact that, in the embodiments illustrated in FIGS. 6 and 7, the adjustment movement is a longitudinal movement along the brake axis 3, while, in the embodiments illustrated in FIGS. 2 to 5, the adjustment movement is a screwing movement about the brake axis 3.

In principle, the adjustment mechanism 15 can operate in the manner of a gearing and can convert an actuating movement acting on one of the housing parts 9 into an adjustment movement. For example, in the embodiments illustrated in FIGS. 2 to 5, an actuating movement which is a pure rotational or pivoting movement about the brake axis 3 is converted via the adjustment mechanism 15 in a manner yet to be explained into an adjustment movement with a linear movement portion. Specifically the adjustment movement produced in this manner is a screwing movement with a linear movement portion along the brake axis 3.

Self-locking of the adjustment mechanism 15 can be provided in such a manner that the two housing parts 8, 9 are adjustably fixed via the self-locking. This is appropriate in particular if the adjustment mechanism 15, as proposed above, provides a gearing function for converting an actuating movement into an adjustment movement.

In the exemplary embodiments illustrated in FIGS. 2 to 5, the adjustment mechanism 15 has a screwing mechanism with a plurality of engagement portions 16 which are aligned here with the brake axis 3. Such engagement portions 16 are realized in the case of the exemplary embodiment shown in FIGS. 2 to 4. The engagement portions 16 are arranged on one of the housing parts 8, 9, here on the housing part 8. The engagement portions 16 here are threaded portions which run along a spiral path.

Furthermore, in the exemplary embodiment illustrated in FIGS. 2 to 4, mating portions 17 are provided which, in the mounted state, are each in screwed engagement with an engagement portion 16. The mating portions 18 are arranged here on the housing part 9.

In this connection, it is pointed out that the design of the threaded portions 16 and/or of the mating threaded portions 17 may in each case only be approximate to the design of an ideal threaded geometry. It is essential for this exemplary embodiment that, as a result, a corresponding screwed engagement comes about.

Figure 5:
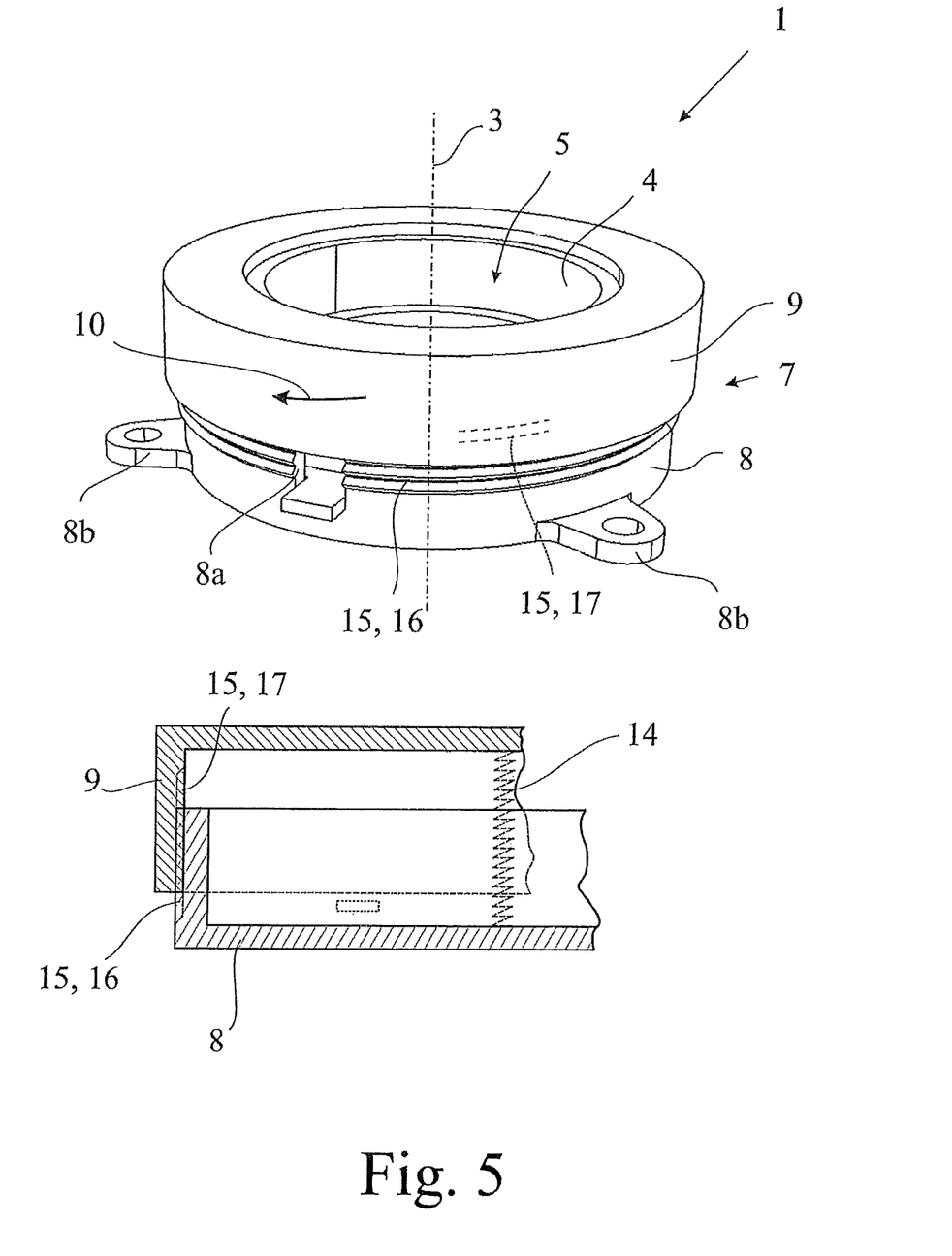
FIG. 5 shows a perspective illustration and a schematic illustration of the brake arrangement according to FIG. 1 in a second embodiment.

In the exemplary embodiment illustrated in FIG. 5, an engagement portion 16 and a mating engagement portion 17 are likewise provided. The engagement portion 16 is designed here as an encircling thread on the housing part 8, which thread is interrupted only by the cutouts 8a discussed above. The mating engagement portion 17 is a corresponding mating thread on the housing part 9.

It is of interest in the case of the exemplary embodiment illustrated in FIGS. 2 to 4 that the engagement between a threaded portion 16 and a corresponding mating threaded portion 17 is a form-fitting, here latching engagement blocking a screwing movement. For this purpose, the threaded portions 16 and the mating threaded portions 17 are equipped with intermeshing latching formations 18, 19. The above self-locking of the adjustment mechanism 15 is thus realized by a corresponding latching engagement. The latching can be overcome here by the application of an increased actuating force.

Whereas, in the exemplary embodiment illustrated in FIG. 5, the housing part 9 has to be screwed onto the housing part 8 for assembly, a much simpler assembly is produced in the case of the exemplary embodiment illustrated in FIGS. 2 to 4. Here, the adjustment mechanism 5 provides a coupling in the manner of a quarter-turn fastener between the two housing parts 8, 9 by the threaded portions 16 and the mating threaded portions 17 being correspondingly interrupted. The effect which is therefore achieved is that a fixing of the two housing parts 8, 9 with respect to each other, at any rate with respect to the brake axis 3, requires merely an axial movement, followed by a short pivoting movement. A prolonged screwing-on movement can be dispensed with to this extent.

The coupling in the manner of a quarter-turn fastener between the two housing parts 8, 9 is realized here by the engagement between the threaded portion 16 and the mating threaded portion 17. However, the realization of a slotted link which is arranged in one of the housing parts 8, 9 and in which a slotted link follower arranged on the other housing part 8, 9 in each case runs, is also conceivable.

Figure 6:
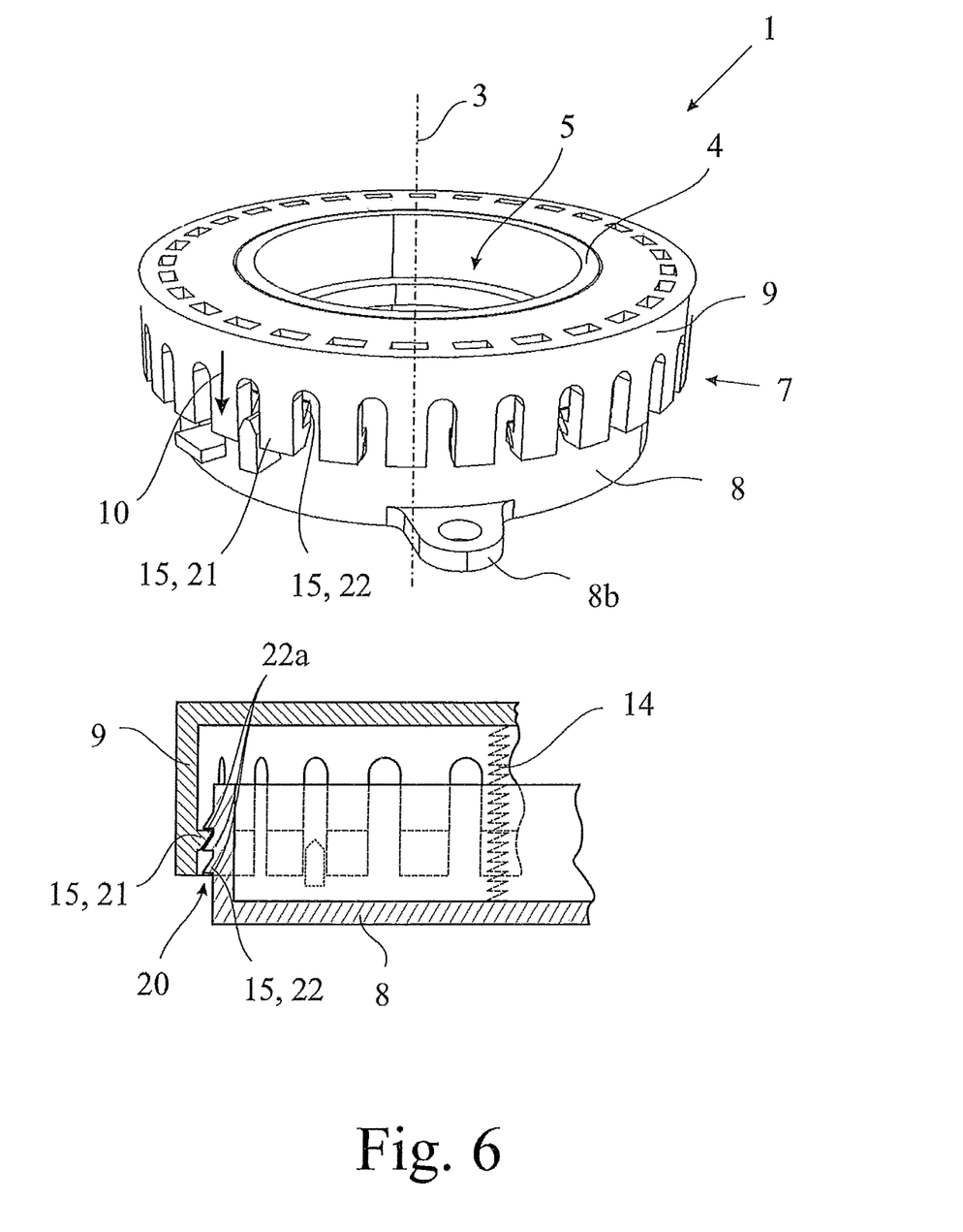
FIG. 6 shows a perspective illustration and a schematic illustration of the brake arrangement according to FIG. 1 in a third embodiment.

In an embodiment illustrated in FIG. 6, the adjustment mechanism 15 provides a latching arrangement 20 for the adjustable, latching fixing of the two housing parts 8, 9 with respect to each other. The latching arrangement 20 has latching elements 21 which are configured here as latching arms. The latching elements 21 are assigned latching strips 22 which run axially with respect to the brake axis 3 and permit the latching elements 21 to latch at different axial latching positions. For this purpose, the latching strips 22 have a plurality of axially distributed latching steps 22a, into which the latching elements 21 can latch. The assembly of the housing part 9 on the housing part 8 is therefore limited to the housing part 9 being plugged onto the housing part 8, wherein the adjustment of the braking force and at the same time of the latching of the latching elements 21 into the latching strips 22 are associated with the plugging-on operation. In very general terms, the latching engagement between the two housing parts 8, 9 can therefore be produced by a linear adjustment movement of the two housing parts 8, 9 along the brake axis 3.

Figure 7:
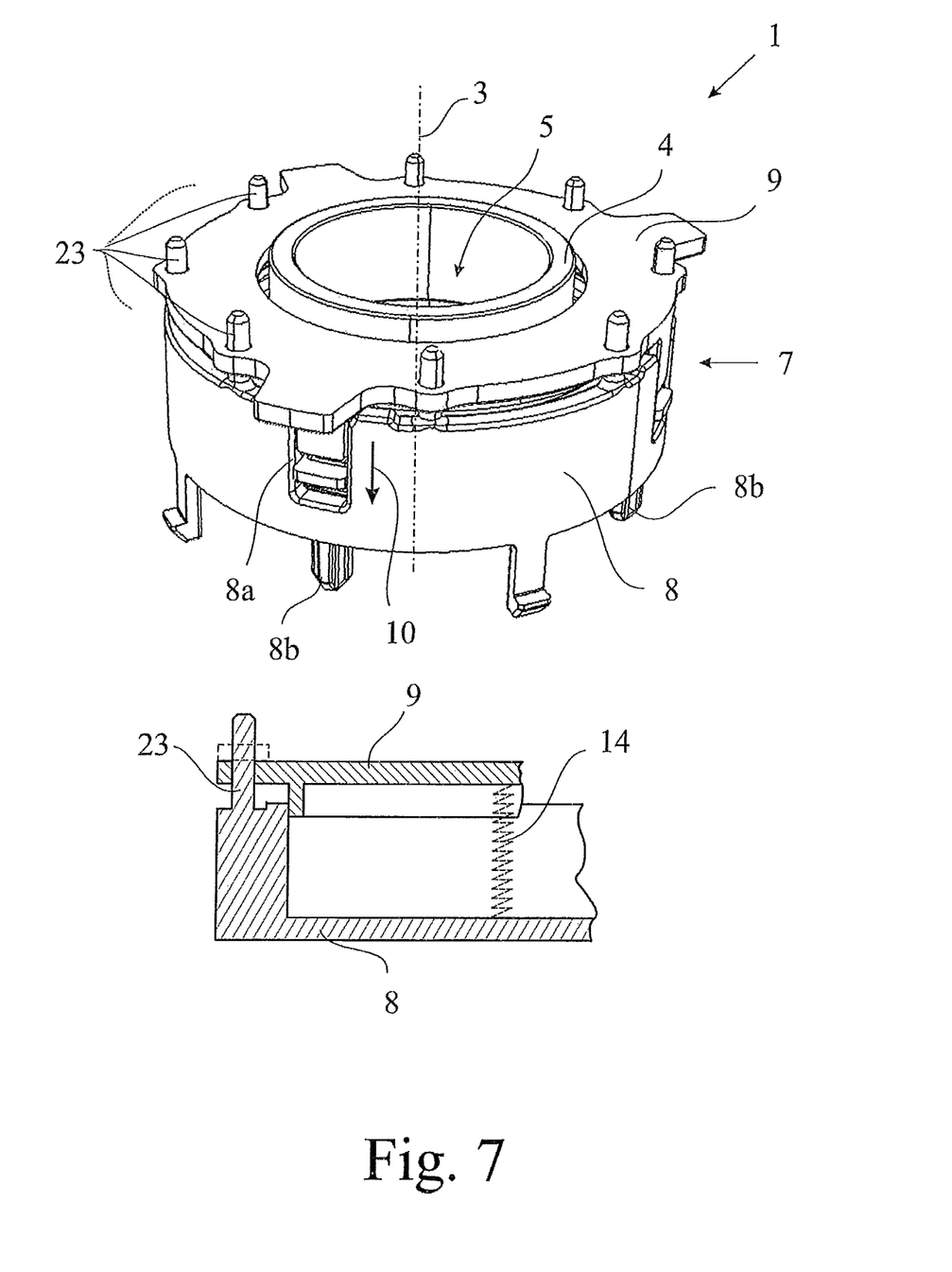
FIG. 7 shows a perspective illustration and a schematic illustration of the brake arrangement according to FIG. 1 in a fourth embodiment.

The embodiment illustrated in FIG. 7 is a variant which can be produced particularly cost-effectively. It is provided here that the housing part 9 is fastened to the housing part 8 via individual fastening elements. The exemplary embodiment which is illustrated, in the case of the fastening elements 23, fastening bolts which are connected to the housing part 9, which is in the manner of a plate here, by hot calking, by stamping or the like. The connecting state is illustrated in FIG. 7, in the schematic illustration there, by a broken line. The hot calking or stamping takes place specifically whenever the desired adjustment state of the housing parts 8, 9 and therefore the desired braking force are adjusted. Alternatively, it can also be provided that the fastening elements 23 are threaded bolts or screws, and therefore the adjustment of the braking force is brought about by an appropriate positioning of screw nuts screwed onto the threaded bolts 23 or screws screwed in a corresponding manner here into the housing part 8.

Numerous advantageous variants are conceivable for the geometry of the housing parts 8, 9. Here, at least one of the housing parts 8, 9 is of substantially cup-like design, as indicated above, and therefore the components to be accommodated are protected. The respective cup-like housing part 8, 9 can then be aligned with the brake axis 3. As an alternative thereto, it can be provided that, as likewise indicated above, at least one housing part 8, 9 is of substantially cover-like design and is, in turn, aligned with the brake axis 3.

The housing part 8 here is of substantially cup-like design, which housing part 8 serves for accommodating the components involved in the braking operation. The other housing part 9 is of substantially cover-like design here, which permits the adjustability according to the proposal of the brake arrangement 1 with little use of material. In principle, numerous advantageous geometries are conceivable for the housing 7. In particular, the housing 7 can also have more than two housing parts 8, 9.

In the case of the exemplary embodiment which is illustrated in FIGS. 2 to 4, the cover-like housing part 9 is provided to the outside with a toothing 24, here with an internal toothing 24, which is provided for the engagement of an adjustment tool with a corresponding matching toothing.

According to an embodiment, a flap drive 25 for the motorized adjustment of a flap 2 of a motor vehicle is described, wherein a brake arrangement 1 according to the proposal is arranged in or on the drive train of the flap drive 25. The wording "in the drive train" means that the brake arrangement 1, here the connecting element 4, is coupled to a drive component of the drive train 25. The wording "on the drive train" means that the brake arrangement 1, here the connecting element 4, is coupled indirectly to the drive train, for example by the brake arrangement 1 acting on a ring gear or the like of a planetary gearing which is assigned to the drive train and operates as a coupling.

The housing 7, in particular the housing part 8, is furthermore arranged here on the flap drive so as to be non-rotatable with respect to the brake axis 3. For this purpose, the housing part 8 is provided with corresponding fastening elements 8b.

The connecting element 4 can basically be coupled directly to a drive component of the drive train. However, as an alternative thereto, it can also be provided that a coupling arrangement is connected in between, said coupling arrangement providing a free wheel in predetermined actuating states such that, in said actuating states, the brake arrangement 1 does not provide any braking effect on the drive train. Such an actuating state can consist, for example, in that the flap 2 is not intended to be adjusted in a motorized manner by the flap drive 25, but rather manually by application of a user force.

As discussed above, the coupling arrangement can be accommodated in the receiving space 6 within the connecting element 4. In this connection, the provision of the connecting element 4 with a leadthrough 5 turns out to be particularly advantageous. For example, it can be advantageous that at least one drive component is guided through the leadthrough 5 to the coupling arrangement. In an embodiment, a coupling input shaft and a coupling output shaft are guided coaxially through the leadthrough 5, wherein one of the shafts is accordingly configured as a hollow shaft.

For additional details regarding the further teaching, reference should be made to the statements with regard to the brake arrangement according to the proposal.

According to an embodiment, a method for producing a flap drive is described. It is essential here that the brake arrangement 1 is adjusted to an in particular predetermined braking force such that manufacturing tolerances of the components involved in the braking operation can be compensated for. The adjustment of the braking force takes place, as proposed above, by an adjustment movement of the two housing parts with respect to each other. In an embodiment, the adjustment of the braking force takes place before the brake arrangement 1 is fitted into the flap drive 25 and in particular before the flap drive is fitted into the motor vehicle. Reference should also be made in this connection to the statements regarding the brake arrangement 1 according to the proposal and the flap arrangement according to the proposal.

The invention claimed is:

1. A flap drive for the motorized adjustment of a flap of a motor vehicle, wherein a brake arrangement is arranged in or on a drive train of the flap drive, the brake arrangement comprising:
   a connecting element, which is rotatable in a braked manner about a brake axis, for releasing the braking force;
   wherein a housing accommodating the connecting element and having a first housing part and a second housing part is provided, wherein at least a portion of the connecting element is contained within the housing;
   wherein the braking force is adjustable by an adjustment movement of the two housing parts with respect to each other;
   wherein the housing is assigned an adjustment mechanism for the adjustable fixing of the two housing parts with respect to each other;
   wherein the adjustment mechanism has a screw mechanism, wherein the screw mechanism comprises at least one threaded portion and a mating threaded portion,
   wherein the threaded portion is in, or is configured to be brought into, screwed engagement with the mating threaded portion;
   wherein the flap is configured to be moved between an open position and a closed position over an angular range of angular positions; and
   wherein the braking force is equal at two or more than two angular positions of the flap that are separated from each other by at least 50% of the angular range of the flap;
   wherein the connecting element surrounds the brake axis.

2. The flap drive for the motorized adjustment of the flap of the motor vehicle as claimed in claim 1, wherein the generation of the braking force is attributed to a frictional engagement between at least two brake elements.

3. The flap drive for the motorized adjustment of the flap of the motor vehicle as claimed in claim 2, wherein the pretensioning of the brake elements is associated with a pretensioning of the housing parts in relation to each other.

4. The flap drive for the motorized adjustment of the flap of the motor vehicle as claimed in claim 2, wherein at least one of the brake elements is arranged with respect to the brake axis so as to be non-rotatable in relation to the housing, and wherein at least one of the brake elements is coupled to the connecting element.

5. The flap drive for the motorized adjustment of the flap of the motor vehicle as claimed in claim 2, wherein the brake elements are pretensioned on one another, and wherein the pretensioning is adjustable by the adjustment movement of the two housing parts with respect to each other.

6. The flap drive for the motorized adjustment of the flap of the motor vehicle as claimed in claim 5, wherein the pretensioning is oriented along the brake axis.

7. The flap drive for the motorized adjustment of the flap of the motor vehicle as claimed in claim 1, wherein the adjustment movement is a longitudinal movement along the brake axis or a screwing movement about the brake axis.

8. The flap drive for the motorized adjustment of the flap of the motor vehicle as claimed in claim 1, wherein the adjustment mechanism, in the manner of a gearing, converts an actuating movement acting on one of the housing parts into an adjustment movement.

9. The flap drive for the motorized adjustment of the flap of the motor vehicle as claimed in claim 8, wherein an actuating movement, which is a rotational or pivoting movement, is converted via the adjustment mechanism into an adjustment movement with a linear movement portion.

10. The brake arrangement as claimed in claim 1, wherein the adjustment mechanism provides a coupling in the manner of a quarter-turn fastener between the two housing parts such that a fixing of the two housing parts with respect to each other, in each case with respect to the brake axis, requires an axial movement, followed by a pivoting movement.

11. The brake arrangement as claimed in claim 1, wherein the engagement between the threaded portion and the mating threaded portion provides a coupling in the manner of a quarter-turn fastener between the two housing parts.

12. The brake arrangement as claimed in claim 1, wherein the adjustment mechanism provides a latching arrangement for the adjustable, latching fixing of the two housing parts with respect to each other.

13. The flap drive for the motorized adjustment of the flap of the motor vehicle as claimed in claim 1, wherein at least one housing part is of substantially cup-like design and is aligned with the brake axis, and/or wherein at least one housing part is of substantially cover-like design and is aligned with the brake axis.

14. A method for producing the flap drive as claimed in claim 1, wherein the brake arrangement is adjusted to a predetermined braking force.

15. The brake arrangement as claimed in claim 1, wherein the screw mechanism has at least one engagement portion, which is in, or can be brought into, screwed engagement with at least one mating engagement portion.

16. The flap drive for the motorized adjustment of the flap of the motor vehicle as claimed in claim 1, wherein a latching engagement between the threaded portion and the mating threaded portion blocks a screwing movement between the first housing part and the second housing part.

17. The flap drive for the motorized adjustment of the flap of the motor vehicle as claimed in claim 16, wherein the threaded portion and mating threaded portion comprise intermeshing latching portions.

18. The flap drive for the motorized adjustment of the flap of the motor vehicle as claimed in claim 17, wherein latching between the intermeshing latching portions can be overcome here by the application of an increased actuating force.

19. A flap drive for the motorized adjustment of a flap of a motor vehicle, wherein a brake arrangement is arranged in or on a drive train of the flap drive, the brake arrangement comprising:
   a connecting element, which is rotatable in a braked manner about a brake axis, for releasing the braking force;
   wherein a housing accommodating the connecting element and having a first housing part and a second housing part is provided, wherein at least a portion of the connecting element is contained within the housing;
   wherein the braking force is adjustable by an adjustment movement of the two housing parts with respect to each other;
   wherein the housing is assigned an adjustment mechanism for the adjustable fixing of the two housing parts with respect to each other;

wherein the adjustment mechanism has a screw mechanism, wherein the screw mechanism comprises at least one threaded portion and a mating threaded portion, wherein the threaded portions is in, or is configured to be brought into, screwed engagement with the mating threaded portion;

wherein the flap is configured to be moved between an open position and a closed position over an angular range of angular positions; and wherein the braking force is equal at two or more two angular positions of the flap that are separated from each other by at least 50% of the angular range of the flap;

wherein a latching engagement between the threaded portion and the mating threaded portion blocks a screwing movement between the first housing part and the second housing part; and wherein the connecting element surrounds the brake axis.

* * * * *